Feb. 9, 1943.   W. J. MILLER   2,310,858
METHOD AND APPARATUS FOR THE MANUFACTURE OF POTTERY WARE
Original Filed Nov. 4, 1931   4 Sheets-Sheet 1
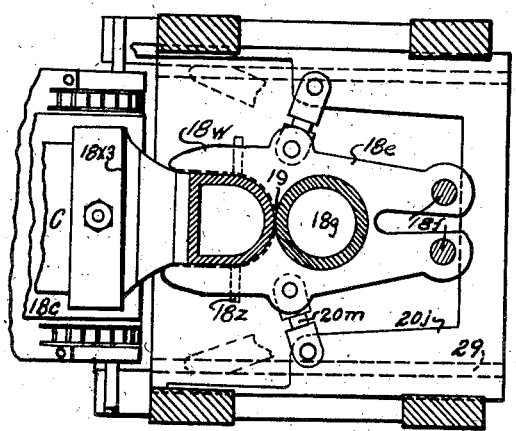
Fig.11
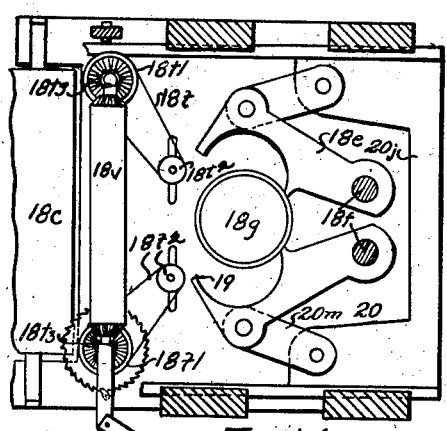
Fig.14
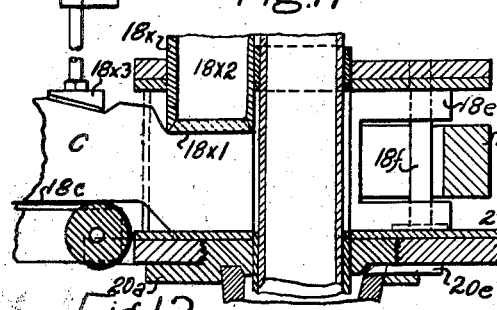
Fig.12
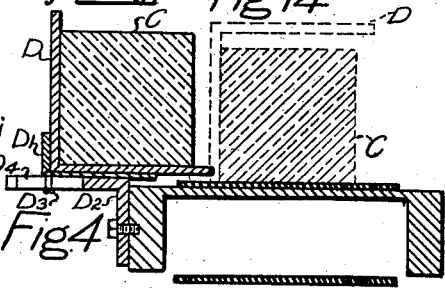
Fig.4
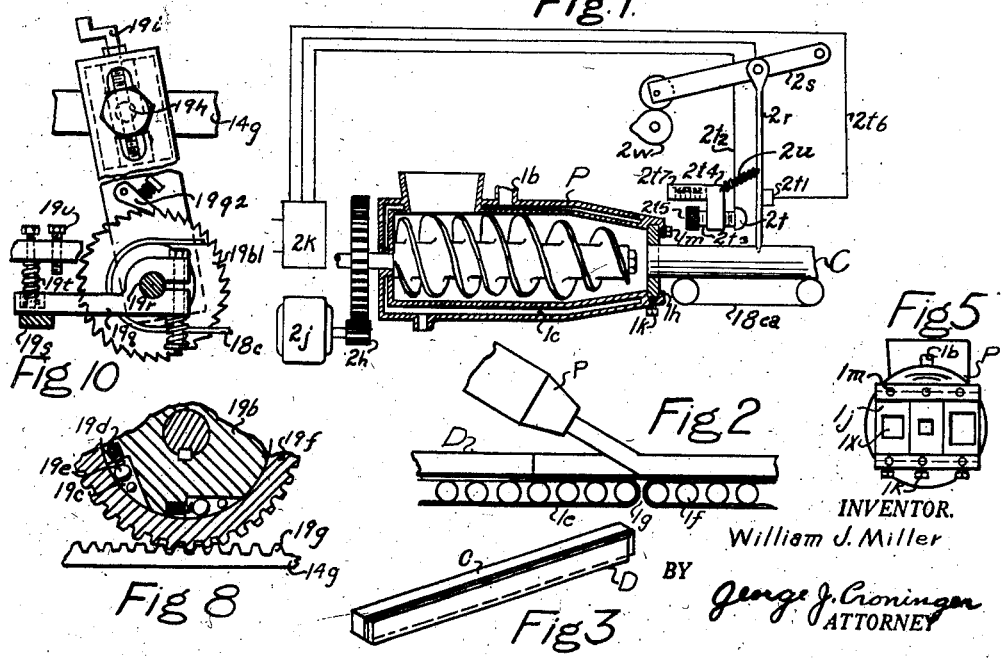
Fig.1
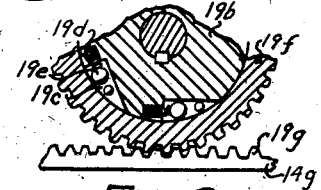
Fig.10
Fig.2
Fig.8
Fig.3
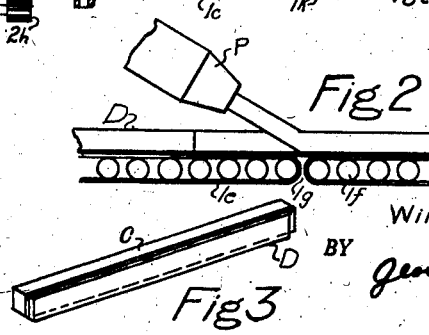
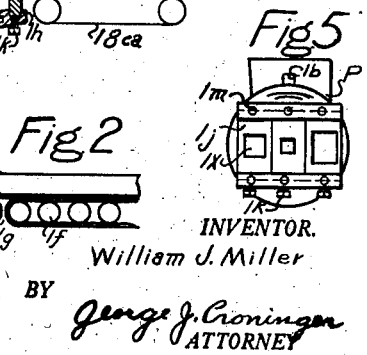
Fig.5
INVENTOR.
William J. Miller
BY George J. Croninger
ATTORNEY

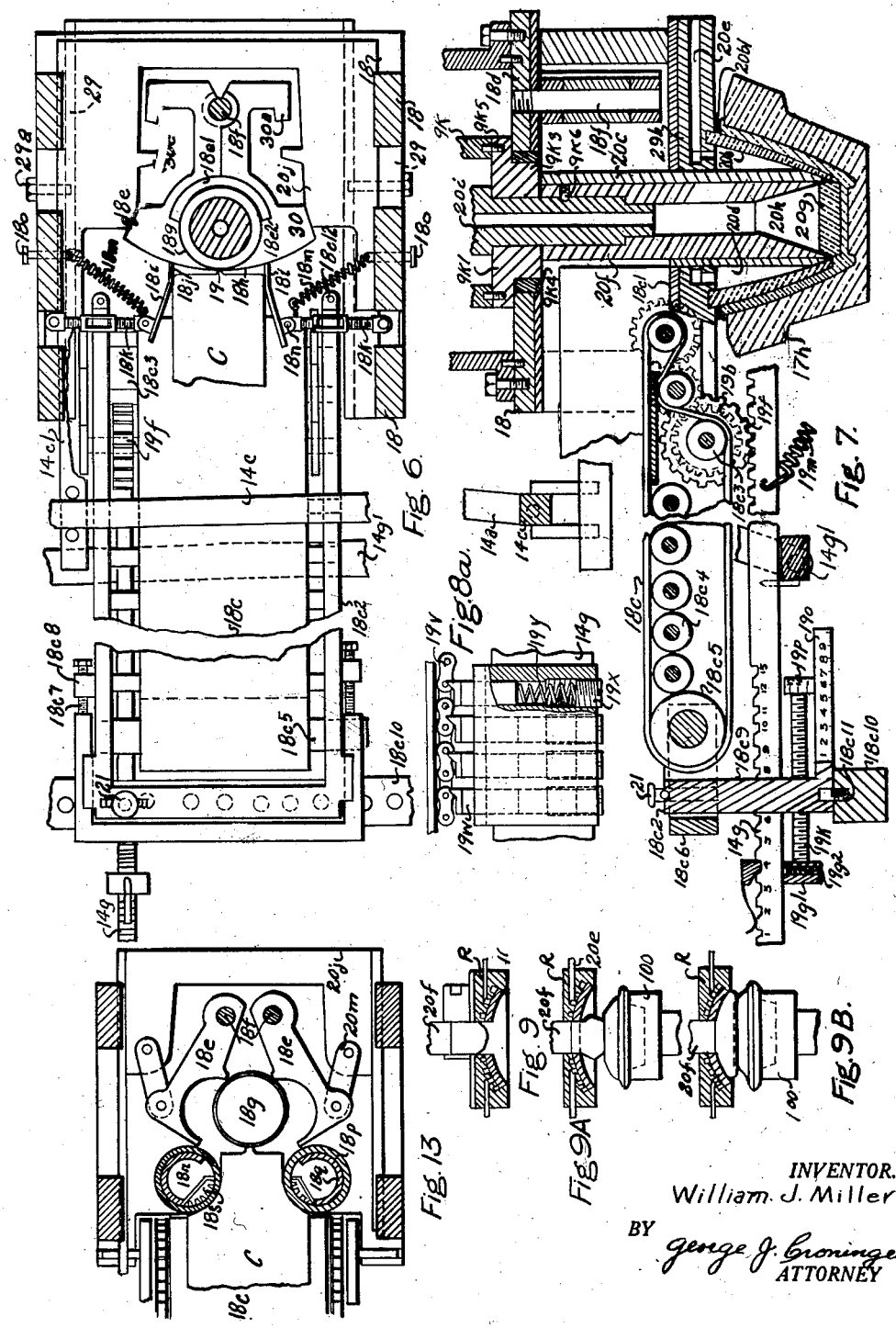

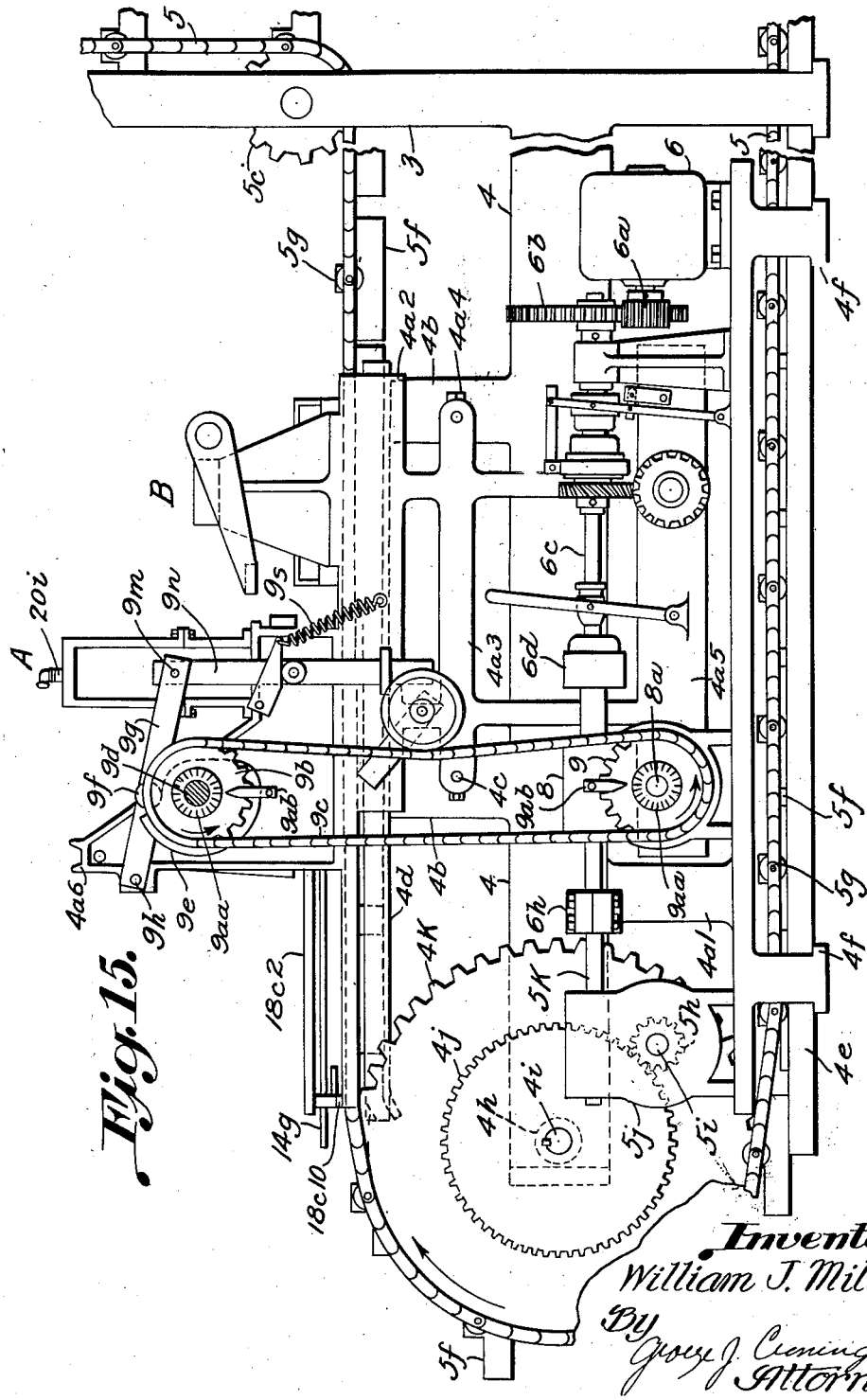

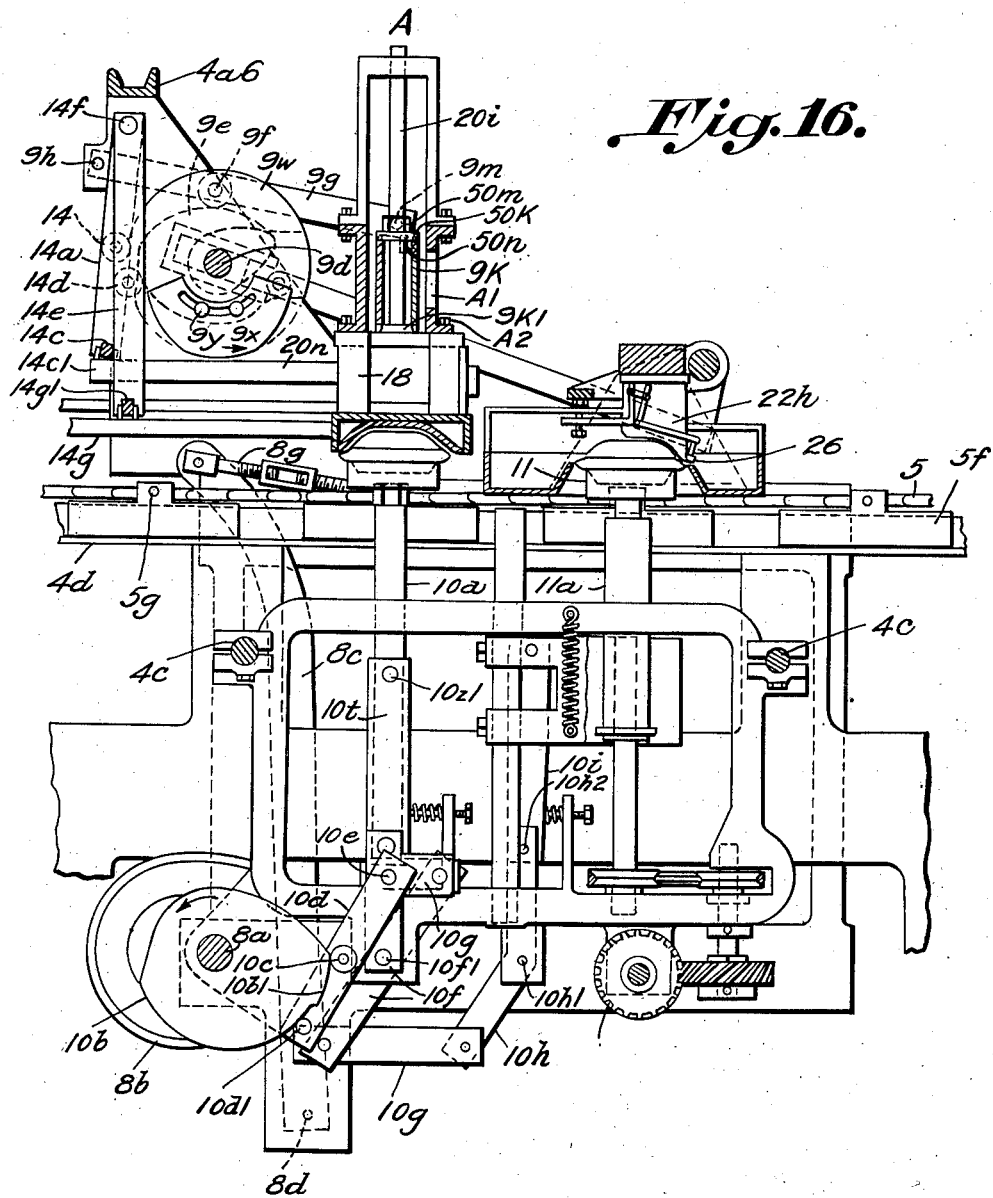

Patented Feb. 9, 1943

2,310,858

UNITED STATES PATENT OFFICE 2,310,858

METHOD AND APPARATUS FOR THE MANUFACTURE OF POTTERY WARE

William J. Miller, Swissvale, Pa.

Original application November 4, 1931, Serial No. 573,017. Divided and this application November 2, 1935, Serial No. 47,990

100 Claims. (Cl. 25—22)

This invention relates to improvements in methods and apparatus for the manufacture of pottery ware, particularly dinnerware or those articles known to the trade as cups, saucers, plates, bowls, etc. heretofore manually jiggered from plastic clay on the conventional potters wheel.

This application is a division of my co-pending application Serial Number 573,017 for Process and installation for making pottery ware, filed November 4, 1931 now Patent 2,109,028. The present application relates to methods and apparatus for charging molds with clay and involves specifically the production, transportation and feeding of clay slugs, the production of clay charges therefrom and the applying thereof to the mold on which the charge is finally formed into ware.

The objects of the invention are; to form and apply clay charges to molds from preformed slugs of conditioned clay; to form clay gobs or mold charges of measured bulk which may be varied incident to or during production; to produce pottery ware in a multiple of types of clay simultaneously and provide for quickly changing from one clay to another without interrupting production; to maintain a predetermined bulk of clay in the blank or semi-formed ware and provide for quick alteration in a known degree of this bulk without interrupting production; to feed the clay to the mold with substantial avoidance of air inclusion; to preclude to the greatest extent possible the inclusion of foreign substances in the clay and to prevent mastication of the clay subsequent to extrusion; to provide novel apparatus for forming clay slugs and to provide novel methods and means of transporting such slugs without shape deformation between the pug and feeder and to provide apparatus for accurately feeding clay slugs, segregating the charges therefrom and applying said charges to the molds.

In the drawings, Fig. 1 is a sectional and diagrammatic elevation of a pug mill for forming and supplying clay slugs; Fig. 2 is an elevation of the pug mill extruding directly onto transporting angles; Fig. 3 shows an angle containing a slug of clay; Fig. 4 shows a quick method of positioning the slug on the feeder conveyor; Fig. 5 is a front view of the pug mill; Fig. 6 is a plan view partly in section showing the feeder station; Fig. 7 is an elevation partly in section of the apparatus of section 6; Fig. 8 is a detail of the feeder belt drive; Fig. 8A is a detail of a modified form of feeder belt drive; Figs. 9, 9A and 9B are diagrammatic illustrations showing the clay charge being extruded and preformed on a porous mold; Fig. 10 is a detail of another feeder belt drive; Figs. 11 to 14 inclusive show modifications of the charge feeding apparatus. Figure 15 is a side elevation of a jigger machine with which the clay supplying apparatus is associated and Figure 16 is an elevation, partly in section taken through the center of the machine of Figure 15 longitudinally of the conveyor chain illustrating feeding and forming stations and associated mechanism.

In general outline, the installation for the production of pottery ware according to the present invention consists of: pug mills P, Figs. 2 and 5, adapted to prepare slugs C of conditional pottery clay, if desired heated, which slugs are deposited on angles D (receptacles) Figs. 2 and 4, of suitable material for enabling them to be handled; or extruded directly into the feeding apparatus; a fabricating machine comprising a feeding station A, Figures 15 and 16, a profiling station B, and an endless mold conveyor 5 for transporting a series of mold trays 5f suspended by trunnions 5g from the links of the conveyor chains through these stations and a dryer (not shown) in endless repeated cycles as explained in greater detail in the parent case. Each mold tray has a plurality of mold seats and the machine is adapted to fabricate simultaneously a corresponding number of different lines of ware.

The feeding station A is adapted to receive elongated conditioned clay slugs and has devices, for automatically advancing the slug to a charge severing or segregating mechanism capable of great precision of charge measurement, a die for accurately forming and contouring the charge onto the mold, a plunger for delivering the measured charge onto the mold under ideal conditions, and means for reliably releasing the charge from the die. The profiling or forming station B, includes several jiggering apparatus, corresponding in number to the number of lines of production, arranged transversely of the conveyor 5, each comprising a profile 22h, a trimmer 26, ware lubricators (not shown) and a rotatable and elevatable mold chuck 11 for raising molds off the conveyor seats into co-operation with the overhead tools where the ware is jiggered by relative rotation between the tool and mold. This jiggering apparatus is described in detail in the parent Patent No. 2,109,028.

In the making of pottery ware, it is desirable to apply the charge of plastic clay securely to the mold in the form of a bat of preshaped form of the correct volume, contour, thickness, diameter, and condition, and in a manner ensuring the most efficient and economical formation to finished form at a subsequent station and that the control of these factors should be reliable, convenient, and therefore as free from operation interruption as possible. For this purpose carefully conditioned clay slugs of uniform predetermined size and shape of cross-section are provided for feeding to the machine.

The clay is conditioned in the pugs P and extruded onto retaining angles D, Fig. 3, for insertion in the pottery forming machine to be fabricated into ware. These angles are preferably treated with a substance such as castor oil to reduce adhesion of the clay thereto but may be lined with a porous material such as felt to decrease adhesion. The pug mills, Figs. 1 and 2, of the extrusion type, are provided with controllable connections $1b$ for conveying a heating medium such as steam, hot air, or electricity to chambers $1c$ in the shell of the pug mills and/or the interior of the same to raise and control the temperature of the extruded slug of clay, or the clay and water may be heated prior to insertion in the pug for a purpose hereafter explained. To provide for the making of multiple kinds and sizes of ware, each requiring a different quality of clay or size of extruded slug, I provide a plurality of pug mills in close proximity to the fabricating machine and each pug may be provided with a plurality of openings $1x$ (Fig. 5) for extruding slugs of different cross-sectional sizes and/or shapes. Also each pug may be fed with clay of different color, quality or condition.

The angles or pellets D serve to preserve the shape of the extruded slug C and provide for stacking the slugs without the clay slugs themselves coming in contact with each other due to the angles being larger than the slugs. The angles D also provide for transporting without distortion and applying in correct position and alignment, the slugs to the belts in the feeder station. The slugs and also the supporting angles D are made to a size suited to the size of the ware being made, thus, when a large charge is necessary, slugs of larger cross section are employed than when making small ware. The maintenance of cross sectional uniformity of the slug is of supreme importance as it provides for subsequent accurate segregation of charges having a uniform bulk. Also, the compacting of the clay by the pug orifice serves to eliminate cavities or other defects in the clay which might be reflected in the ware subsequently made. Any lapping or juncture marks in clay, prior to application, have a detrimental effect on the ware produced and it is desirable after slugs leave the pug orifice, to avoid any mastication or lapping over effect tending to produce lines of juncture.

A frame housing a series of belts $1e$ supported on rollers $1f$ mounted on anti-friction bearings, suitably supported in position under the pug orifices, serves to support the angles D to receive the relatively limber slugs as they emerge from the extruding orifices, and to provide clearance for inserting and supplying empty angles D. I arrange the orifices of the pugs P at the lower side of the casing.

The angles and deposited slugs are moved to the right (Fig. 2) by the force of the extruded clay and to prevent distortion of the slugs by reaction of the angles, the belts $1e$ slope slightly downwards from the mouth of the pug mill. As all the slugs from a multi-orifice pug mill do not emerge at a uniform speed, each belt supports one slug only and is mounted on rollers independent of the others. A gap $1g$ between the belts facilitates cutting the slugs at the joints between the angles.

The slug sizes are also progressively stepped in height for each given width and the widths are also progressively stepped to thereby provide a slug having a cross-section best suited to the production of a compact charge when segregated. To avoid complication, a minimum number of slug sizes should be used.

To enable a single pug mill P to deliver slugs of different cross-section, and for controlling the number of slugs extruded, the mill is provided, as shown in Fig. 1, with interchangeable die members having orifices of different shapes and sizes. The mouth of the pug mill has a slot $1h$, open at both ends, into which the orificed die $1j$ can be slidingly inserted. The die is located in the slot by a screw $1k$, and gibs prevent the die from being pushed away from the pug casing by the clay. Screws $1m$ (only an upper screw shown) are provided in the outer lips of the slot $1h$, which enable the die to be seated against the inner faces of the slot and also permit the pressure of the clay on the die to be relaxed when it is desired to change the die. This is effected by inserting the new die into the slot unit it is in edgewise abutment against the die to be removed, and then pressing the new die into place with simultaneous ejection of the other die.

The slugs C thus deposited on the transportable angle supports D may be manually delivered to the chage segregating and feeding station apparatus A. One way of doing this is shown in Fig. 4 in which the angle and slug are shown at the left, placed in a position alongside a conveyor belt of the feeder station, which position is definitely located by an angle guide D1 which can be adjusted on its support D2, by means of a screw D3 extending through a slot D4 in the support D2, to suit slugs of different width. The angle support D, and the slug C, are then merely tilted over into the position shown at the right of Fig. 4 in dotted lines, in which the slug is supported by the feed belt, and the angle then removed.

When making ware of a staple kind in which continuous production over a long period of time is desired, the slugs may be automatically fed into the feeding station A by means which will now be described. An individual extrusion apparatus or pug mill Fig. 1 is mounted in front of each feed apparatus, see Figs. 6 and 7, and is arranged to extrude clay intermittently in amounts determined by computation or by previous practice directly into said feed apparatus.

A short idler belt $18ca$ or rollers to reduce advance resistance and support the slug may be interposed between the die $1j$ and the feeder jaws $18e$. This belt $18ca$ takes the place of the feed belt $18c$ shown in Figs. 6–7 and subsequently described.

The pug mill P delivers the slug C directly onto the belt $18ca$, this mill being driven by a motor $2j$ through gears $2h$. The motor starter is controlled by a relay $2k$.

An anchor $2r$ is provided, adapted to engage the slug and be moved thereby. This anchor $2r$ is pivoted on a bell crank lever $2s$ and its travel is defined by stops $2t$ and $2t1$ forming contacts in the circuit of the relay $2k$. A spring $2u$ urges the anchor $2r$ in the direction of the stop $2t$ in the motor starting branch $2t2$ of the relay circuit, which spring is tensioned by the slug as it advances to the right. The stop $2t$ can be adjusted longitudinally with respect to the stop $2t1$ in order to provide for adjustment of slug advance and size of charge or gob, for which purpose the stop is mounted on a screwed rod $2t3$ co-operating with threaded guide $2t4$ and has an indexed operating head $2t5$ and scale $2t7$. The other stop $2t1$ may be fixed and it is connected in the motor stopping branch $2t6$ of the relay circuit. The anchor $2r$ is raised by a cam $2w$.

The operation is as follows: The anchor 2r is raised from the slug by the cam 2w whereupon the spring 2u moves it against the stop 2t which energizes the motor starting branch of the relay circuit and causes the motor to start and a slug to be extruded by the pug mill P on to the belt 18ca. As the slug advances it carries the anchor 2r against the stop 2t1 thereby energizing the motor stopping branch of the relay circuit and stopping the motor stopping branch of the relay circuit and stopping motor. The jaws 18e, Figs. 6 and 7, then pinch off the gob. The motor remains stopped until the cam 2w, Fig. 1, again actuates the anchor and initiates another cycle. The cam 2w is driven from the machine drive in suitably timed relation with respect to the operation of the jaws 18e. I thus directly measure the slug advance instead of slug support as shown in Figs. 6 and 7.

The mold conveyor and the fabricating units of the machine are mounted in a frame comprising a main frame casting and a secondary frame casting. The main frame casting consists of longitudinal members 4, a base 4a, brackets 4a1 spacing the base from the longitudinal members 4, brackets 4b extending upwardly from the members 4, and feet 4f, all these parts forming an integral casting. Cross bars 4c having bearings in the brackets 4b sustain the secondary frame casting 4a2, which has a middle horizontal member 4a3 secured to the cross bars by means of screws 4a4, a lower horizontal member 4a5, and an upper bracket portion 4a6. Upper tracks 4d and lower tracks 4e for the mold trays are mounted on the brackets 4b and feet 4f respectively. The main frame members 4 are provided with bearings 4h supporting a shaft 4i to which a gear 4j and a pair of sprockets 4k are secured. At the right hand end, the frame members 3 are provided with bearings supporting a pair of sprockets 5c secured to a shaft 5d. Two chains 5 carrying the trays 5f are in engagement with sprockets 5c and 4k and are supported intermediate thereof by the trunnions 5g of the trays. The trays are in sliding engagement with the tracks 4d and 4e. The chains extend through a drier. The gear 4j is in engagement with pinion 5h rotated by a shaft 5i and a worm gear drive 5j driven by a shaft 5k. A motor 6 supplies power and transmits its motion to the shaft 5k through gears 6a and 6b, a shaft 6c, and 5k and a clutch 6d, thus providing for continuous rotation of the sprocket 4k. The trays 5f (Fig. 15) are hung above their center of gravity by their trunnions 5g so they will be maintained in a horizontal position regardless of direction of travel of chain 5. The shaft 6c, in addition to driving the conveyor sprockets, also drives the device for actuating the mold trays in the slack portion of the mold conveyor, which is more fully described and claimed in my British Patent No. 293,023. For this purpose the shaft 6c is connected by worm gearing 8 to a cross-shaft 8a carrying a pair of cams 8b (Fig. 16) which cams oscillate levers 8c pivoted to the frame at 8d, rollers on the levers engaging the operative cam track.

The levers 8c have at their upper ends adjustable pawls 8g making intermittent contact with the trunnions 5g on the right hand stroke of the levers only and trailing idly as the levers move to the left, thus providing for shifting some of the trays intermittently to the right in the course of the general advance of the chain and trays over sprockets 4k and 5c.

As the trays are shifted to the right, slack accumulates to the right of the shifted tray and is dissipated or absorbed to the left of the tray due to the synchronization of sprockets throughout the machine as explained in the parent patent.

The cross shaft 8a, Fig. 15, is also used to drive the fabricating units of the machine, for which purpose a sprocket 9 is secured to shaft 8a and transmits motion through a chain 9c to a sprocket 9b, driving a shaft 9d to which are secured cams for operating the various implements positioned above the trays, see Fig. 16. To provide for eliminating resiliency in the elevation of the chucks 10 and 11, secured to shafts 10a and 11a, a toggle mechanism is provided.

A cam 10b on shaft 8a oscillates a lever 10d pivoted at its lower end on a fulcrum 10d1 and carrying a roller 10c engaging the cam. The upper end of this lever 10d is jointed by a link 10e to a lever 10f connected by suitable joints 10g, to one of the toggle levers 10h, pivoted medially on a fulcrum 10h1. The other toggle member 10i is jointed at its upper end 10i1 to the chuck stem 10a or spindle 11a and at its lower end 10h2 to the toggle lever 10h, this joint constituting the knee of the toggle. The parts are so arranged that in one position the toggle members 10h, 10i and the chuck stem are in alignment providing rigid vertical support for the chuck while in the other condition the toggle parts are collapsed, corresponding to lowered chuck.

As it is of vital importance to insure against uncontrolled resiliency to obtain accurate terminal elevation to the chucks 10 and 11 as will be explained later, the toggle mechanism, due to the elements thereof being in compression and not subjected to bending strain, provides a simple but efficient solution. As the cam 10b is rotated, the chucks 10 and 11 are caused to reciprocate in synchronism with the movement of the conveyor 5, the shifting mechanism and the cam shaft 8a.

The shaft 8a has also adjustably secured thereto, two cams 16 (not shown) serving to reciprocate a pitman for controlling the rotation of the chuck of the profile station B.

In Figs. 15 and 16, the cam shaft 9d has secured thereto two cams 9e and which are in engagement with rollers 9f to the frame 4a at one end and at the other to a cross head 9k, pivoted at 9m for operating a plunger which feeds the clay charges to the molds. A guide bar 9n, Fig. 15, depends from the pivot 9m and is guided at 9o. A roller 9p is pivotally secured to 9n and a lever 9q is pivoted to the frame at one end and to a tension spring 9s at the other. A cam portion 9r contacts with the roller in such a way that when the crosshead 9k is in its lowermost position, the spring 9s exerts its maximum pressure, and, when the cross head is in its uppermost position, the lever 9g and cam portion 9r are substantially in a vertical position and exert no vertical pressure on the roller 9p and consequently the cross head 9k descends by gravity only at its upper end of travel, and under progressively increased spring power at its lowermost end of travel. The shaft 9d has secured thereto a grooved cam (not shown) for operating the profiling and trimming appliances at station B. The shaft 9d also has secured thereto, cams 9w operating on a roller 14 (Fig. 16) secured to lever 14a which in turn is pivoted to the frame 4a at 14f and at the other end to a cross bar 14c for operating slug severing jaws as hereinafter described. Cams 9x for the feed belt drive are adjustably secured to the cams 9w by screws 9y and contact with rollers 14d secured to lever 14e which in turn is pivoted to the frame 4a at 14f and at the other end connect with a cross bar 14g1 which actuates the pitmans 14g which in turn actuate the belt moving mechanism hereinafter described. The horizontal bar 14g1 severs to operate all the pitmans 14g to thus avoid the use of a separate cam and lever for feeding each slug. A fork secured to the pitmans 14g severs to operatively connect pitmans 14g and bar 14g1.

In Fig. 15, protractor dials 9aa are shown secured to the ends of the shafts 8a and 9d for the purpose of ascertaining and recording, for subsequent re-setting, the various cams on the cam shafts to thereby provide for predetermined setting of various functions of each separate mechanism to suit various types of ware and conditions of clay etc. obtained by previous tests. A pointer 9ab facilitates accuracy.

An adjustable coupling 6h connecting shafts 5k and 6c facilitates adjustment of the cam shaft 8a with that of the sprocket 4k to initially bring the chain slack and tray shift into synchronism.

The machine may be equipped with units, one to make cups, another saucers, another cereals, bread and butter plates, dinner plates, etc., so that at each functioning of the machine, one complete unit of a dinner set may be fabricated to thereby provide for synchronized production of dinner sets (except pieces of irregular shape which have to be cast), without the necessity of storage of one article while another is being made.

In Fig. 16, the feeder unit A is shown as secured to a frame girder A¹ by means of dowelled studs A², a series of holes being provided in girder A¹.

When employing the transferring angles, Fig. 3, the preferred form of belt structure for feeding the slugs is as shown in Figs. 6 and 7. Each slug feeder belt 18c which is endless and made of rubber covered non-resilient material, is mounted so the upper run thereof is at a higher elevation than the surface of a platen 18c1 to thereby reduce or avoid contact and resistance to the advance of the projecting end of the slug and insure uniform and reliable advance. This platen may be hollow and have a porous upper face through which air under pressure can be forced to prevent adhesion or release the slug tip from the platen.

A rectangular frame 18c2 houses a series of drive rollers 18c3 for the belt, which is supported on idle rollers 18c4 and undulated over the rollers 18c3 which are of small diameter to provide ample traction in a minimum vertical space. The front belt roller 18c5 is mounted in a yoke 18c6 slidably arranged on the frame 18c2 and adjustable relatively thereto by means of screws 18c7 threaded in lugs 18c8 of the frame 18c2, for the purpose of keeping the belt taut.

A depending extension 18c9 of the frame 18c2 rests on a crossbeam 18c10 of the machine frame in which is fixed a series of spaced dowels 18c11. The feeder belt frames 18c2 have corresponding dowel holes whereby the frames can be easily and accurately located transversely of the machine in alignment with the devices with which the slug feeders co-operate. The other end of the belt frame 18c2 rests on a frame member 18 or base 29b hereinafter described, and is located by dowels 18c12 and dowel holes in like manner. One of the belt driving rollers 18c3 has secured thereto a spider 19b, Fig. 8, of a clutch mechanism. This spider is provided with wedge shaped recesses 19c in its periphery, housing rollers 19e pressed by springs 19d against the inner periphery of a ring gear 19f meshing with rack teeth 19g on the reciprocable pitman 14g. As the pitman 14g is reciprocated, the clutch mechanism causes the rollers 18c3 and consequently the belt 18c to be progressed forward, in one direction only, the rollers 19e trailing idly when the ring gear 19f rotates clockwise.

In Fig. 7, is shown a structure which provides for accurately adjusting the extent of progression of the belt 18c. The belt roller 18c3 is driven by the friction drive, Fig. 8, and the pitman 14g is guided in the frame member 18c9. A micrometer screw 19k is screw threaded in the frame member 18c9, its graduated head 19p cooperating with the fixed scale 19o. This screw 19k serves as stop for an abutment 19g1 on the pitman 14g. The pitman 14g is pushed to the left by means such as a cam operating in timed relation with the machine and retracted by a spring 19m so that its travel termination to the left is constant and its travel to the right is adjustable. Presuming that one rotation of screw 19k advances the screw one graduation on scale 19o, it is evident that minute micrometer adjustments of the advance of the pitman 14g and consequently of the clay slug C may be made while the machine is in operation and by noting the position of the indicating dial and the scale 19o, and with a predetermined size slug on the belt 18c, the machine may be set to cut off extremely accurate weight charges initially without tedious experiment. Also, the weight may be increased or decreased to a known extent quickly and while the machine is in operation.

The abutment 19g1 with which the screw 19k contacts, is adjustably secured to one end of the pitman 14g, by means of notches in the pitman and a corresponding tooth on the abutment, a spring 19g2 holding the parts in engagement. This provides for quick major adjustments of slug advance. A scale on the rack indicates the position of the abutment.

To provide for discontinuing the feeding of clay to any unit, a latch 21 slidably socketed in the frame 18c2 is provided, which when thrown into engagement with a notch of the pitman 14g holds the pitman 14g in extended position and prevents progression of the clay.

Figs. 6 and 7 also show the preferred mechanism for segregating charges of clay from the preformed slug and delivering the charge to the mold. The frame member 18 is of open rectangular box-like construction and houses a pair of jaws 18e pivoted at 18f to the top portion 18d of the member 18. A vertical bore 18g extends through the jaws and the exterior entrance end 18h of the jaws are in the form of an arc having the center of the hinge or pivot pin 18f as a center. Bearing against this contoured surface 18h, are slug guides 18i serving to guide the slug C centrally to the bore 18g. These guides 18i have scraper ends 18j which bear against the contoured surface 18h of the jaws 18e and serve to scrape off any clay that might adhere to the face 18h and thereby prevent accumulation of clay at that point. The cutting edges 19 of the jaws 18e when in open position are substantially in alignment with the scrapers 18j so that all the clay will be scraped off and an unbroken surface provided for entrance of the slug C. The scrapers 18j are adjustably supported as by the adjustable link 18k which permits their angle of inclination relative to the slug sides and their extent of approach of each other, or slug clearance to be adjusted. The spring 18m serves to resiliently maintain the edge 18j against the jaw face 18h. The pivots 18n of the link 18k are in form of bolts to clamp the link in any desired position at one or both ends. The tension of the spring 18m is adjusted by screw 18o to thereby adjust the degree of pressure with which the scrapers 18j contact with the jaws 18e.

The guides 18i are preferably faced with a porous material over a chamber connected to a source of air at superatmospheric pressure through control valves, to repel slugs of adhesive nature from their surfaces to insure unretarded accurate advance of the slug.

However, when clay of a less adhesive nature is being used a highly polished, abrasive resistant face, such as chrome plate may be employed.

The jaws 18e are provided with lugs 30 and arms 30a, and are operated by means of a reciprocable yoke 20j driven through a sliding bar 14cl by lever 14a and cross bar 14c. This yoke has tapered ledges engaging tapered flanks of the jaw lugs 30 in the left hand movement of the yoke 20j, to close and lock the jaws, and dogs 30c which engage the jaw arms 30a in the right hand movement of the yoke, to open the jaws. The jaws are cut away at the side nearer the pivot 18f and a separate complementary member 18e1 corresponding in shape to the cut away portion is stationarily mounted in the frame 18 or as an extension of a bushing 20c, to prevent advance of the clay beyond the rear of the orifice. The mating edges 18e2 of the member 18e1 and of the cut away part of the jaws are circular to wipe off any clay which may be projected over the joint face.

As the jaws 18e close to sever a charge, the cutting edges 19 will displace some material to right and left. When extremely soft sticky clay is employed, it tends to sag against the jaw faces 18h and to adhere thereto.

To avoid this I provide for simultaneously cutting and retracting the slug end away from the faces 18h as, in Fig. 10, I show a method of retracting the belt to a known extent as the jaws close. A lever 19q frictionally engages the shaft 19r, and at its other end on one side abuts against a stop 19s and on the other side against an adjustable spring 19t; a screw 19u adjustably limits the clockwise travel of the lever 19q. As the belt is progressed, the spring 19t is compressed and on the return movement of the pitman 14g, the spring 19t is compressed and on the return movement of the pitman 14g, the spring 19t tends to reverse the direction of travel of the belt 18c to a known extent to thus retract the material away from the jaws 18e.

In Fig. 8A, a modified form of retracting mechanism is shown. The belt 18c has secured to it a chain 19v which is advanced directly by pitman 14g through pawls 19w spaced to engage the chain links progressively, so that the slug is advanced positively to a known extent and the retraction is governed by the back pressure from the jaws aided by the degree of pressure of the inclined flanks of the pawls 19w against the links of the chain 19v, the degree of which may be adjusted through the screws 19x and the springs 19y.

Figs. 6 and 7 show, as an example, a preforming mechanism for bowls or cups, it being understood that the teachings of this invention are applicable to the making of flatware simply by mounting the proper form of die R for 20b, see Figs. 9, 9A and 9B. The frame 18 of the jaw mechanism is provided with a quickly removable base 29b. A porous die 20b is cemented or otherwise removably secured in the die base 20a, Fig. 12, or directly in the base 29b encircling the sleeve 20c secured permanently in the base, a chamber 20d being provided between the die and the sleeve. A conduit 20e provides for conveying, under valved control, a fluid under substantial pressure to the chamber 20d. The die proper 20b is of porous material such as porous mixture of cement and sand, open structure bisque, etc. A plunger 20f provided with a porous face 20g is in telescopic engagement with the sleeve 20c and is provided with a stem 20i and chamber 20h communicating through control valves with a source of compressed air. Said stem 20i is adjustably secured to a cross head 9k, Figure 16, for vertical reciprocation.

Fig. 7 also shows a structure for quickly interchanging the feeder plunger 20f in predetermined position and also for making minor adjustments. The upper portion 18d of the frame 18 is bored and provided with a guide bushing 9k4 bored to fit the largest diameter plunger of a series adaptable thereto. The plunger 20f is internally threaded and provided with a screw or detent 9k6 for adjustably securing it to the plunger stem 20i. A clamp bar is secured to the stud and provided with a boss 9k3 which is a sliding fit in a bushing 9k4 and two dowels 9k5 are secured in the bar 9k1 and enter accurately spaced holes in the crosshead 9k aligned with the holes in the other supports heretofore described, serving to accurately position the plunger relatively to other apparatus without tedious adjustment. The parts 9k3 and 20f are provided with an index dial and pointer to visibly ascertain and record the adjustment, the detent 9k6 serving for quick adjustment while in operation. As shown in Fig. 16, the stud 20i extends up through another clamp bar 50k, nut 50m and key 50n. The narrow width of the bar 9k1 permits the quick removal of the entire assembly through the cross head 9k by simply loosening the nut 50m to clear the dowels 9k5, Figure 6, then rotating the assembly 90°. The upper guide bushing 9k4 is common to all diameters of plungers, therefore need not be exchanged. These provisions enable the plunger to be adjusted correctly, before installation, from previous records, and delay in production is avoided.

Figs. 6 and 7, also show mechanism for quick interchange of dies. The floor of the frame 18 is cut away and the inner sides are provided with grooves 29 through which project detents 29a. The die base 29b is tongued at the sides to fit into the grooves 29 and on its upper surface provided with a wearing plate or platen 18cl. The ducts 20i connect through quickly removable couplings to valves for the application and control of fluid such as those shown in my co-pending application Serial No. 513,017. To replace a die, the plunger is elevated, the air connection is uncoupled and the die with its base is pulled out to the right or left and another die slipped into place and coupled up, and as the seatings are snug and accurately machined, instant alignment with the mold is assured. The detent 29a insures alignment and prevents accidental displacement of the die.

The operations of feeding and preforming are performed as follows: A slug of clay is placed on the belt 18c, the jaws 18e being open, the slug is advanced a predetermined distance beyond the cutting portions 19, and over the opening 18g (Fig. 6), the jaws then close, cutting off the projecting stub and also then tend to compress and form to partial cylindrical shape, the pinched off gob or piece of the slug. This compressing also serves to hold the gob and prevent it from falling out of the opening 18g prematurely. The plunger 20f now descends forcing the charge, and simultaneously the mold is elevated, and the charge is forced out of the severing jaws and downwardly onto the mold, Fig. 9, and then progressively compressed and spread over the mold as shown in Fig 9A and Fig. 9B, the mold shown being for flatware but the operations are substantially the same in making cups or bowls. The charge first contacts with the middle of the mold, then is gradually spread over the surface of the mold, progressively contacting with the surface thereof to an equal degree all around and pushing out any air in advance thereof.

The termination pressure is very high due to the gradual restriction of the space between the mold and die and is further accentuated by the circumferential final substantial closing of the gap between said mold and die.

A ring 20b1 Fig. 7 of resilient material such as rubber is preferably mounted on the die adjacent the ware brim to define and finally compact said brim. Its resiliency facilitates slight vertical variation in mold elevation, for determining bat thickness, without substantially altering the degree of brim compacting. Under excessive pressure it yields and permits the excess clay to escape in thin sheet form and on decompression it progressively parts from the clay bat brim. A resilient porous material such as felt may be employed and air under pressure applied thereto during parting of bat from the die to absolutely ensure release.

The final elevation of the mold and final depression of the plunger may or may not be simultaneous as found most advantageous. The complete elevation of the mold is only momentarily to provide a pause during which the applied clay charge stabilizes itself and comes to rest. After this short pause, it is preferred to drop the mold slightly by providing cam 10b, Figure 4, with an offset 10b1, and, substantially simultaneously admit compressed air to the cavities 20d and 20h and concurrently through the porous die 20b and head 20g to the juncture of the formed clay bat and the porous die, which serves to rupture the bond, repel the clay bat from the die, and ensure adhesion of the bat to the mold. The chuck is kept elevated to hold in this position the maximum period of time permissible in a cycle, thereby providing a prolonged interval during which the bat and mold may be repelled from the die without serious consequences. Should there be a slight tendency to adhere and the chuck were immediately lowered, then the mold would drop a considerable distance and might be broken by the impact. However, this short drop being only about $\frac{1}{32}$ of an inch, provides for delayed release without serious consequences and consequent interruption of operations. To still further provide against possibility of adhesion of the bat and mold to the porous die, and also insure adhesion of the bat to the mold, vacuum is applied in the chuck just prior to final elevation of the mold, then prior to the mold contacting with the tray seat, the vacuum is shut off and super atmospheric pressure may be admitted to release the mold from the chuck. To provide against the formation of ring marks on the ware the charge is spread preferably rather quickly which prevents halting of the spreading action which might otherwise take place due to setting or hardening of the clay before the charge has completely covered the mold. To further insure against interruption or derangement in operation, the degree of hardness at certain points may be increased on the molds where they are subjected to wear or severe pressure from bat application.

A modified slug severing and clay charge feeding mechanism is shown in Figs. 11 and 12. Jaws 18e defining an aperture 18g, are pivoted on pivots 18f and operated by a yoke 20j through links 20m. Extensions 18w are provided on the entrance end of the jaws 18e which serve to compress and preform the nose of the slug to a definite width after which a plunger 18x descends and compresses the preformed slug within the jaws 18w to a predetermined height, said plunger being hollow and provided with a porous facing 18x1. The plunger cavity 18x2 is connected with a source of super atmospheric pressure. The jaws 18w are also faced with a porous material and have connections 18z connected to a supply of air at super atmospheric pressure thus providing for repelling the formed charge from the jaws and preventing adhesion. As an auxiliary to plunger 18x, a presser foot 18x3 with an inclined porous operative face is provided which serves to partially reduce and, to a degree, push back or retract the excess material from the preforming jaws. The jaws 18e are provided with a cutting edge 19 which serves to segregate the charge from the slug. The belt 18c is intermittently progressed forward to advance the slug to the jaws. This degree of advance once set must be maintained constant and the extent of this advance is adjustable, preferably while in operation and to a known extent (see Fig. 10).

Another modified form of device for feeding the clay slug to the severing jaws is shown in Fig. 13.

In this figure the guides for the slug are shown in the form of rollers 18p whose outer surface is of porous material, each mounted on a pivot or spindle 18q which is stationary and contains two chambers 18r, 18s separated by a partition. The chamber 18r is connected in any suitable manner to a source of compressed air and the chamber 18s on the clay compacting side of the roller, to a source of vacuum. These spindles 18q are adjustably secured to the frame 18d and the rollers 18p are rotated by means of a bevelled gear drive somewhat similar to that shown in Fig. 14. When a slug of clay comes in contact with the rollers, it adheres thereto due to the suction set up through the porous wall of the roller and chamber 18s and is repelled by the super atmospheric pressure through the walls of the roller after it passes dead center between the rollers. The height of the charge is limited by a roller, not shown, similar to that shown at 18v, Fig. 14. This arrangement provides for drawing a non-uniform over-sized slug of clay forward and reducing it to a uniform size in cross section. Also, the degree or extent of progression of the slug that has passed between the rollers may be predetermined.

Fig. 14 shows another modification of this wherein belts 18t, preferably made of porous material, or fabric, operate over rollers 18t1 and 18t2 whose periphery may or may not be of porous material or equipped for sub or super atmospheric pressure application are provided for advancing a non-uniform over-sized slug, reducing it to a uniform size and advancing it a predetermined distance. The rollers 18t1 are driven in unison by bevel wheels 18t3 from the rod 14g, and the rollers 18t2 are adjustably mounted to vary the gap between them.

A modified form of drive for the slug feed belt is shown in Figure 10.

In this figure a ratchet wheel 19b1, lever 14g, and pawl 19g2 are shown as a means of progressing the belt 18c, and the degree of advance is shown as adjustable while in operation by means of a movable pivot 19h of the lever 14g. The adjustment of the pivot is effected by a screw and crank mechanism 19i as described in my previous application Serial No. 275,395. A series of pawls 19g2 may be applied in such a way as to fall into the ratchet teeth progressively to thereby provide for closer adjustment of progression.

I claim:

1. The process of making pottery ware which comprises, forming a compact slug of conditioned clay of predetermined cross-section, laying the slug in a rigid receptacle, emptying the slug therefrom onto a movable support, applying force to the support to advance the slug in steps of measured length to a severing location, severing a compact gob from said slug and applying the gob to the working surface of a porous mold.

2. The process of applying clay to a porous jigger mold which comprises, depositing the mold in a chuck, feeding a charge of clay thereto, spreading the charge rapidly on the mold under increasing pressure by approaching said mold and a co-operating porous surface, lowering the chuck slightly from the said surface, retaining the chuck temporarily in said lowered position, and applying fluid under pressure through the pores of said surface to repel the clay and mold therefrom and return the mold to said chuck.

3. In a machine for making pottery ware the combination which comprises, a porous mold, a mold support, a conveyor adapted to support an elongated slug of clay, means for advancing said slug stepwise towards the mold, means for cutting and compressing gobs from said slug, and means for feeding said gobs onto the porous mold.

4. In a machine for making pottery ware the combination which comprises, a porous mold, a mold support, a conveyor adapted to support an elongated slug of clay, means for advancing said slug stepwise towards the mold, means for cutting and compressing gobs from said slug, means for visibly predetermining the bulk of the gob, and means for feeding said gobs onto the porous mold.

5. In a machine for making pottery ware, the combination which comprises, movable supports carrying ware molds, a conveyor adapted to support an elongated slug of clay, means for advancing said slug stepwise towards a mold, in timed relation with the movement of the supports, means for cutting and compressing gobs from said slug, and means for determining the length of the gobs.

6. In a machine for making pottery ware the combination which comprises, a conveyor adapted to support an elongated slug of clay, means for advancing said slug stepwise, jaws between which the front end of the slug is fed, said jaws defining a chamber, mechanism for opening and closing the jaws in timed relation with the advance of the slug, a plunger movable through said chamber to expel the clay gob severed by closure of the jaws, and means for supporting and operating a porous mold below said plunger.

7. In apparatus for manufacturing pottery-ware, the combination which comprises, means forming a chamber for confining a ware charge, means for feeding clay slugs, progressively into said chamber, means for varying the amount of clay fed into the chamber, means for severing the clay from said slug, a mold and support therefor disposed below and in registry with said chamber and means for progressing the charge from the chamber onto said mold.

8. In apparatus for manufacturing pottery-ware, the combination which comprises, means forming a chamber for confining a ware charge, means for feeding clay from a clay mass into said chamber, means for varying the amount of clay fed into the chamber, means for severing the clay in said chamber from the mass, means for progressing the charge from the chamber onto a mold, means for spreading the charge over the mold surface and means for substantially excluding atmospheric air from the charge while being so progressed.

9. A process of forming mold charges in the manufacture of dinnerware from plastic adhesive clay comprising forming an elongated slug of plastic clay, depositing the slug on a movable support, intermittently advancing the slug longitudinally by power applied to the support, severing bodies from the slug, shaping the bodies into mold charges simultaneously with the severing operation and predetermining the amount of material contained in the charge by the distance the support travels between severing operations.

10. Apparatus for charging porous jigger molds with plastic jiggering clay which comprises, an extrusion machine, an elongated support for receiving extruded slugs of clay containing material for several mold charges, a charge severing device adjacent one end of said support, means for progressing said slugs in endwise fashion to the cutting off point defined by said charge severing device and means for controlling the volume of clay cut off including a manually operable fine adjustment device associated with the slug progressing means.

11. Apparatus for feeding clay to a mold charging device in the manufacture of pottery ware, comprising, an endless belt, supporting means for the latter providing a substantially linear and horizontal upper run of said belt capable of supporting a preformed slug of clay without deformation, a charge severing device operative adjacent the advance end of said run, means for intermittently advancing the upper run of said belt towards the severing device, means for intermittently operating the severing device in timed relation with the belt movement, and slug guides operative between the end of said upper run and the severing device.

12. Apparatus according to claim 11 comprising; means for adjusting the slug guides to receive slugs of different cross-section.

13. Apparatus for forming mold charges in the manufacture of pottery ware comprising, an endless slug-feed belt, a charge severing device operative adjacent the advance end of said belt, gob shaping means associated with the severing device, means for intermittently advancing the slug and belt towards the severing device, and means for intermittently operating the severing device in timed relation with the movement of the belt.

14. Apparatus for forming mold charges in the manufacture of pottery ware comprising, a chambered charge former including a charge severing device, means for feeding a slug of clay progressively into the chamber, scrapers arranged to remove adhering clay from the severing device, and means for advancing the feed means and for actuating the severing device in timed relation.

15. Apparatus for forming mold charges in the manufacture of dinnerware and the like from elongated, extruded slugs of clay which comprises, a periodically operable segregating means, means for advancing slugs of clay in endwise fashion to the cutting off point defined by the segregating means at a uniform rate and means adjacent the severing means for imparting a predetermined cross section to the slug to thereby assist in making the volume of clay contained in successive charges of uniform proportions.

16. Apparatus for forming mold charges in the manufacture of pottery ware comprising, a charge severing device, means for intermittently advancing a slug of clay into operative position with respect to the severing device, shaping means adjacent said charge severing device adapted to impart a predetermined cross section to the slug, and fluid means for repelling the clay from the shaping means.

17. Apparatus for forming mold charges in the manufacture of pottery ware comprising, an endless conveyor belt adapted to feed a clay slug longitudinally while preserving its shape and dimensions, a charge severing device operative upon the advance end of the slug, an oscillatory drive member, and connections between said drive member and said belt including a clutch operative to advance the belt in one direction of oscillation of the drive member, and to permit idle motion of said member in its other direction of oscillation.

18. A device for extruding pottery clay comprising, a container, a nozzle plate formed with a plurality of extrusion orifices and adjustable on the container to bring any of the orifices into extrusion position, and a grooved flange clamp for retaining the nozzle plate in such position.

19. In a pottery making installation, a conveyor belt adapted to convey slugs of clay while preserving their shape and dimensions, a fixed support extending parallel to the direction of travel of a linear portion of said belt, a movable elongated profile member capable of giving form preserving support to the slugs, and means for aligning the profile member on the fixed support with one of its longitudinal edges parallel to the direction of travel of said linear belt portion and in a predetermined location relatively to the axis thereof, said aligning means also permitting tilting of the profile member transversely about said longitudinal edge to transfer a slug from the profile member into a predetermined position on said belt portion.

20. In apparatus for the manufacture of pottery ware in combination, a mold, a movable plunger having a stem for operating said plunger, a clay severing device, means for operating said clay severing device in timed relation with the plunger and a stationary die co-operating with the end of the plunger and said mold on which the ware is formed, during the application of the clay to the mold.

21. In apparatus of the class specified, a forming die and a support therefor there being a tongue and groove connection therebetween and a releasable lock for preventing relative movement when in associated relation.

22. In combination with a pottery machine for making diversified ware, charge forming means for producing mold charges varying in the amount of clay contained therein in accordance with the requirements of the production from elongated slugs of plastic clay of various cross-sectional dimensions and an extrusion machine for supplying said slugs having means for producing several slugs of various cross-sectional dimensions required, simultaneously.

23. In combination with a pottery machine for manufacturing pottery ware from plastic clay on absorbent molds, charge forming means for simultaneously producing a multiple of clay charges some of which contain a greater or lesser amount of clay than others according to the requirements of the production from a plurality of clay slugs each containing a multiple of mold charges, means for producing said clay slugs and means in the form of transportable receptacles for transporting said slugs from said slug producing means to said charge forming means.

24. In combination with a clay feeder and a pug mill, a receptacle for transporting elongated timber clay slugs between the pug mill and feeder comprising a rigid body portion contoured to preserve the contour of the clay slug means for supporting the receptacle adjacent the pug mill whilst being filled with clay and means for supporting the receptacle whilst being emptied of clay.

25. The method of manufacturing pottery ware which comprises continuously extruding clay in the shape of a column onto a form retaining movable support whilst single charges of measured volume are segregated from one end thereof and are deposited, spread on and adhesively bonded to molds.

26. The method of feeding clay to molds in the manufacture of pottery ware which comprises, extruding clay in the shape of a column into rigid transportable supports, said column containing a multiple of mold charges, transporting the said support to an automatic pottery ware fabricating machine feeder and there progressing the column of clay at a uniform rate into the machine feeder whilst charges of measured volume are segregated from one end thereof and are deposited, spread on and adhesively bonded to successively presented jigger molds.

27. In combination with a machine for manufacturing pottery ware on molds, a clay charge producing apparatus, means for forming clay slugs, means for conveying said extruded clay slugs directly upon segregation to said feeding apparatus and there rejoining the segregated slugs and means for controlling the rate of extrusion of said clay and the production of clay slugs according to the rate of consumption of said clay by the feeding apparatus.

28. In apparatus for the manufacture of pottery ware, a plurality of charge segregating devices, means associated with each device for feeding clay in the form of slugs detached from the original source of extrusion thereto, drive means for all of said clay feeding apparatus and means for interrupting the feeding of clay to any one charge segregating unit.

29. In combination with an automatic pottery ware fabricating machine, a charge forming apparatus comprising in combination, a pair of jaws forming therebetween a cavity for the reception of clay, means for feeding clay thereto, means for opening and closing said jaws and means for ejecting clay therefrom.

30. In a pottery ware manufacturing machine, a clay feeding apparatus for charging molds which comprises a pair of co-operable segregating members, means for actuating said members, means for moving a clay mass containing a multiple of mold charges into operative relation with said members and means for retracting the unsevered portion of said clay incident to co-operation of said members.

31. In combination with a machine for manufacturing pottery ware, a mold charging apparatus comprising a pair of co-operable segregating jaws, means for feeding clay into said jaws, means for opening and closing said jaws, a mold, a mold support, means for ejecting clay from said jaws directly onto the surface of said mold, means for elevating said support and a die for co-operation with said ejecting mechanism to spread said charge over the surface of the mold and apply the same thereto.

32. In combination with a machine for manufacturing pottery ware, a mold charging apparatus comprising a pair of co-operable segregating jaws forming therebetween a cavity for the isolation of a clay charge, means for feeding clay into said jaws, means for opening and closing said jaws, a mold, a mold support, means for ejecting clay from said jaws directly onto the surface of said mold, means for elevating said support and a die for co-operation with said ejecting mechanism to spread said charge over the surface of the mold and apply the same thereto and means for repelling the clay from the clay contacting surface of the die and ejector.

33. Apparatus for forming mold charges in the manufacture of pottery ware comprising, an endless conveyor belt adapted to feed a clay slug while preserving its shape and dimensions, a charge severing device operative upon the advance end of the slug, an oscillatory drive member, means for positively actuating the oscillatory drive member in one direction, elastic means for actuating the oscillatory member in the other direction, a stop controlling the amplitude of oscillation in said other direction, micrometer mechanism permitting fine adjustment of said stop, and connections between the oscillatory member and said belt comprising a clutch engaging the belt with the oscillatory member only during its amplitude controlled movements.

34. Apparatus for forming measured mold charges in making pottery ware comprising, an extrusion device adapted to form a compacted clay column of predetermined cross section, a support movable in the direction of the issuing column and adapted to receive said column and to sustain it with undeformed cross section, an intermittently actuated charge severing device operable on the end of said column, means for starting the extrusion during an intermission in the actuation of the severing device, means responsive to an advance of the column end beyond the severing place for stopping the extrusion, and means responsive to stoppage of the extrusion for actuating the severing device to sever a charge from said column.

35. Apparatus according to claim 34 comprising, a fine adjustment device for determining the response of the extrusion stoppage means.

36. Apparatus according to claim 34 comprising, means for anchoring the column during intermissions in its advance.

37. In apparatus for manufacturing pottery ware, means for forming mold charges comprising, a pair of severing jaws, means for intermittently advancing a compacted slug of clay into operative position with respect to the severing jaws, and slug shaping means in front of the charge severing jaws adapted to impart a predetermined cross section to the slug.

38. In combination with a clay extrusion machine and apparatus for preparing charges of clay which are applied to molds and jiggered thereon, a rigid portable receptacle for the transportation of clay between the extrusion machine and apparatus for preparing clay charges, said receptacle being shaped to fit the cross section of the extrusion and being of such length as to accommodate a slug of clay containing sufficient material for a multiple of mold charges.

39. In combination with machinery for forming diversified dinnerware and the like shapes on jigger molds that are transported in lines along prescribed paths, a plurality of charge segregating devices, one to a line of molds, means for receiving slugs of clay containing a multiple of mold charges, associated with each segregating device, means for progressing the slugs of clay at a uniform rate towards the segregating devices, and means whereby the rate of advance of some of the slugs can be increased or decreased over others to thereby obtain the desired volume of clay in the charges produced for a particular line or lines of molds.

40. In combination with a pottery machine for manufacturing diversified shapes in or on absorbent molds from plastic clay, an automatic mold charging means for producing a multiple of charges of varying weight each charge containing a volume of clay approximately equal to the volume of clay in the articles to be produced, means for producing a plurality of extruded clay masses of different cross sectional dimensions corresponding to the size and shape required by the mold charging means and containing a multiple of mold charges and means for feeding said clay masses to said mold charging means.

41. In combination, a pottery machine for making diversified ware from plastic clay on molds from preformed clay bodies containing a multiple of mold charges, means operable on said clay bodies for segregating clay charges, adjustable means for regulating the volume of clay contained on the charge, mechanism for manufacturing clay slugs, a conveyor for transporting said clay bodies from said machines to said mold charging means and means for preserving the shape of said slugs incident to transportation.

42. In combination with a pottery machine for manufacturing jiggered pottery ware shapes in molds, an extrusion machine, means for transporting extruded clay in segregated lengths to said pottery ware machine comprising a rigid container capable of being filled by the extrusion machine, a plurality of mold charging means associated with said machine, and means for feeding said extruded lengths of clay to said mold charging means, said clay being segregated into mold charges and deposited in or on molds.

43. In combination with a pottery machine for manufacturing jiggered shapes from plastic clay on absorbent molds, means for extruding clay, means for conveying said extruded clay to said pottery ware machine whilst preserving the shape thereof, said last named means comprising a transportable receptacle having a surface for receiving and supporting the extruded clay contoured to fit the shape of the extruded clay, a mold charging apparatus associated with said pottery machine having a delivery orifice, and means for progressing said extruded clay into said orifice.

44. Apparatus for the manufacture of pottery ware on molds comprising, in combination, an automatic pottery ware machine having a mold charging apparatus, said mold charging apparatus having a delivery orifice, means for transporting extruded clay to said mold charging apparatus comprising a transportable container contoured to preclude distortion of the clay body incident to transportation and enable positioning of the extruded clay in endwise relation relative to the delivery orifice.

45. In combination, a machine for manufacturing pottery ware on molds having a plurality of mold charging apparatus, means for extruding clay in column form and means for gravitating said column to said mold charging apparatus.

46. In combination, a pottery ware fabricating machine having one or more of mold charging apparatus, means for extruding clay in column form and means for transporting said column in segregated bodies to said feeding means comprising an elongated rigid receptacle shaped to fit the column of clay lengthwise and heightwise.

47. In combination, a pottery ware fabricating machine having a charge segregating apparatus, means for extruding clay in column form, and means for transporting said column to said mold charging apparatus, said last named means including a rigid container adapted to provide lengthwise and crosswise support to said column.

48. In combination, a pottery ware fabricating machine having a clay feeding apparatus, means for extruding clay in column form, means comprising a refillable receptable for transporting said column to said clay feeding apparatus, and means for supporting said receptacle in position to receive a column of clay from said extruding means.

49. In combination, a pottery ware fabricating machine having a mold charging apparatus, means for extruding clay in column form, a refillable container adapted to receive extruded clay and in which said clay is transported to said mold charging apparatus, receptacle transporting means driven at a speed commensurate with the rate of extrusion.

50. In combination, a pottery ware fabricating machine having a plurality of mold charging apparatus, a pug mill mounted in front of each of said apparatus and adapted to extrude clay directly into said apparatus and means for synchronizing the operation of said mold charging apparatus and said pug mill.

51. In combination with pottery ware fabricating machinery, a plurality of mold chargers for producing clay charges, an extrusion machine for supplying extruded lengths of clay containing material for several mold charges from which said charges are produced and means for transporting clay between the extrusion machine and mold charging apparatus comprising rigid, portable, refillable receptacles capable of being filled by the extrusion machine and delivering clay to any one of the mold chargers.

52. In combination, a pottery ware fabricating machine having a mold charging apparatus including a conveyor, drive means therefor, a pug mill arranged adjacent one end of said conveyor and adapted to extrude directly thereonto, drive means for said conveyor and said pug mill and means for synchronizing the operation of said pug mill drive means, said conveyor actuating means and said mold charging apparatus.

53. In combination, a pottery ware fabricating machine having a mold charging apparatus including a conveyor, a pug mill arranged adjacent one end of said conveyor and adapted to extrude directly thereonto, drive means for said conveyor and said pug mill and means for synchronizing the operation of said pug mill drive means and said conveyor actuating means.

54. In combination, a pottery ware machine having a clay feeder, a clay conveyor associated with said feeder, a platen associated with said conveyor and over which the clay passes and means for precluding adhesion of clay therewith.

55. In combination, a pottery ware machine having a clay feeder, a clay conveyor associated with said feeder, a platen associated with said conveyor, said platen having a fluid penetrable upper face through which air under pressure can be discharged to preclude adhesion of clay therewith.

56. In apparatus for the manufacture of pottery ware, the combination which comprises, an automatic pottery ware fabricating machine, means for charging the molds of said machine with a plastic normally adhesive clay including a charge segregating mechanism and means for feeding clay in lengths thereto, said charge segregating means and said feeding means having non-adhesive clay engaging surfaces.

57. In combination with a machine for fabricating pottery ware on molds, a mold charging apparatus including means having a delivery orifice, means for progressing clay in extruded length into said orifice and means co-operable with the mold in shaping the charge thereon for ejecting clay from said orifice.

58. In combination with a pottery ware fabricating machine, a mold charging apparatus comprising a pair of segregating jaws forming therebetween a cavity for the isolation of a charge of clay, means for opening and closing said jaws, means for feeding clay into said jaws and means for operating said last named means in timed relation with the opening and closing of said jaws.

59. In a pottery ware manufacturing machine, a clay feeding apparatus for charging molds which comprises a pair of cutting jaws, means for operating and closing said jaws, means for feeding clay into said jaws and means for retracting the unsevered portion of said clay incident to closing of said jaws.

60. In combination with a machine for manufacturing pottery ware, a mold charging apparatus comprising a pair of co-operable segregating jaws forming therebetween a cavity for the isolation of a clay charge, means for feeding clay into said jaws, means for opening and closing said jaws, a mold, a mold support, means for ejecting clay from said jaws directly onto the surface of said mold, means for elevating said supporting and a die for co-operation with said ejecting mechanism to spread said charge over the surface of the mold and apply the same thereto.

61. In combination with a pottery ware fabricating machine, a mold charging apparatus comprising a pair of separable segregating jaws having co-operable cutting edges, means for feeding clay into said jaws, means for opening and closing said jaws and means for removing adhering clay from the cutting edges of said jaws.

62. In combination with a machine for manufacturing pottery ware, a clay segregating apparatus comprising a pair of separable segregating jaws, means for progressing clay into said jaws, means for guiding the clay into said jaws and means for opening and closing said jaws.

63. In a clay segregating apparatus, the combination which comprises, a pair of segregating jaws forming a cavity for the isolation of a clay charge, means for opening and closing said jaws, means for automatically feeding clay into said cavity, means for precluding adhesion of the clay with the walls of said cavity, and means for ejecting said clay therefrom.

64. The method of manufacturing pottery articles in a mold which comprises separating a portion of plastic material from a parent mass to produce a mold-charge in a position elevated with respect to the mold, and by the movement of a member axially of the mold propelling the mold-charge toward the mold and depositing and shaping it therein.

65. The method of manufacturing pottery articles in a mold which comprises separating a portion of plastic material from a parent mass to produce a mold-charge and by the movement of a forming member axially of the mold depositing the mold-charge and shaping the same in the mold and imparting relative rotational movement between the forming member and the clay charge incident to the shaping operation.

66. An apparatus for manufacturing pottery ware, the combination with a mold of a forming member arranged for reciprocation axially of the mold for depositing and shaping mold-charges therein together with means in which clay charges are formed and from which said charges are ejected by the forming member and deposited and shaped in the mold.

67. The method of manufacturing pottery articles in a mold which comprises separating in one position a portion of the plastic material from the parent mass to produce a mold-charge, transferring the mold-charge into registration with a mold, and by the movement of a member axially of the mold both depositing the mold-charge in the mold and shaping it therein forming the pottery article.

68. The method of manufacturing pottery articles in a mold which comprises separating a portion of the plastic material from the parent mass to produce a mold-charge, transferring the mold-charge into registration with a mold, and by the progressive movement of a forming member axially of the mold depositing the mold-charge and shaping the same in the mold.

69. In apparatus for manufacturing pottery articles, the combination with a mold of a forming member arranged for reciprocation axially of said mold for shaping mold-charges therein, means for producing mold charges and for transferring the mold-charges into position between the forming member and the mold and in registration with the mold whereby the movement of the forming member deposits the mold-charges in the mold preparatory to shaping the same therein.

70. In apparatus for manufacturing pottery articles, the combination of a mold, a forming member arranged for movement axially of the mold to deposit and shape mold charges therein, a container arranged to receive the plastic material, a member arranged for movement into and out of the container and into and out of registration with the mold, said member having an aperture therein to receive plastic material to produce a mold-charge, and means for severing said mold-charges from the parent mass.

71. In apparatus for the manufacture of jiggered pottery ware, in combination, an extrusion machine, a mold charging apparatus, a receptacle for transporting extruded clay between said extrusion machine and said mold charging apparatus, said receptacle being shaped to fit the extruded clay, means for supporting said receptacle adjacent the mold charging apparatus whilst being emptied of clay, said clay being progressed into said mold charging apparatus and means for cutting clay charges therefrom.

72. In combination, an extrusion machine, a mold charging apparatus having a delivery orifice, a rigid transportable receptacle for carrying extruded clay between the extrusion machine and the mold charging apparatus, means associated with said mold charging apparatus for supporting said receptacle whilst being emptied of clay, said clay being progressed into the delivery orifice and means for cutting clay charges therefrom.

73. In combination, an extrusion machine having a delivery orifice, mold charging apparatus having a delivery outlet, means for charging the mold charging apparatus with clay including a rigid transportable receptacle corresponding in cross section to the shape of the discharge orifice at least in part for receiving and transporting extruded clay without shape deformation to the mold charging apparatus, means for cutting clay charges therefrom, means for progressing said clay into the delivery outlet and means for regulating the discharge of clay through said outlet.

74. The method in the manufacture of pottery ware, which comprises, extruding plastic clay into open-ended rigid transportable receptacles to form elongated slugs of clay containing material for several mold charges, transporting the slugs by means of the receptacles to a position from which the slugs are fed in the form of a column in endwise fashion to a cutting off point, and producing in succession charges of clay of substantially uniform weight therefrom by progressing the column of slugs like distances between severings, reducing the leading end of the leading slug to a uniform cross section prior to severance and cutting through the slug at spaced intervals of equal duration.

75. In combination with a pug mill having a clay receiving chamber and an outlet in one wall thereof, means for mounting external attachments thereon in registry with the outlet comprising a grooved flange clamp.

76. In combination, clay feeding apparatus including segregating means, an extrusion machine for producing slugs of plastic clay containing material for a multiple of mold charges, rigid refillable containers for receiving and transporting said slugs from said extrusion machine to said feeding apparatus, means for progressing said slugs in an endwise direction to said segregating means, there being means forming a reduced passage through which a slug is progressed prior to segregation to reduce the cross section thereof.

77. In combination, an intermittently movable mold support, a die arranged in registration therewith, charge feeding apparatus including segregating means, an extrusion machine for producing elongated slugs of plastic clay containing material for a multiple of mold charges, and rigid refillable containers for receiving and transporting said slugs to said clay feeding apparatus.

78. In combination, an extrusion machine, a clay feeder, rigid refillable receptacles for transporting elongated slugs of clay containing material for a multiple of mold charges therebetween, means for supporting said receptacles on said feeder whilst being emptied, means for progressing said slugs into the range of operation of a charge segregating means, and a charge segregating means operable to segregate charges of clay successively from the leading end of the clay fed thereto.

79. In combination, an extrusion machine, a clay feeder, rigid refillable receptacles for transporting elongated slugs of clay containing a multiple of mold charges therebetween, means for supporting said receptacles on said feeder whilst being emptied, means for progressing said slugs into the range of operation of a charge segregating means, a chamber in which the charge is isolated and means for ejecting the charge from the chamber.

80. In combination, a clay extrusion machine, rigid portable receptacles for receiving and transporting elongated lengths of extruded clay and conveying means disposed below the nozzle of said extrusion machine on which said receptacles are disposed and advanced as they are being filled with clay.

81. In combination, a clay extrusion machine, a rigid transportable receptacle for receiving and transporting elongated lengths of extruded clay, said receptacles comprising a body portion substantially L-shaped in cross section and adapted to support the bottom and side of the length of clay.

82. The method of feeding charges of plastic clay to molds on which particles of pottery ware are formed comprising the steps of depositing a mass of plastic clay containing the material for a multiple of mold charges in a rigid receptacle, transporting the receptacle without distorting or disturbing the uniformity of the mass of clay to a mold-feeding mechanism, feeding the mass of clay through a reduced passage, and severing charges from the leading end of the mass and depositing the charges on successive molds presented to the mold feeding mechanism.

83. In the manufacture of dinner ware and other pottery ware, the method which comprises forming elongated masses of plastic clay each containing sufficient material to provide for a plurality of mold charges, individually shifting the masses, while rigidly supporting them to prevent distortion thereof, into adjacency to a mold-feeding station, progressing the clay of a mass toward the feeding station, at intervals transversely severing the leading end portion of the mass to produce individual mold charges, and depositing the severed charges upon molds.

84. In combination with a mold supporting means for receiving and supporting jigger molds, apparatus for supplying clay to said molds comprising a mold charging device adjacent the mold supporting means arranged to contain an elongated mass of clay and to supply from the leading end of the mass individual charges to molds successively presented thereunder, a pug mill arranged to supply independent elongated masses of plastic clay each containing sufficient material for a multiple of mold charges, a rigid refillable receptacle for receiving and transporting an independent mass of clay discharged from the pug mill to the mold charging device, the clay being delivered thereby to the mold charging device in alignment with the trailing end of the mass of clay carried thereby.

85. In combination with apparatus for advancing a line of pottery molds along a path wherein clay is formed on the molds into articles of pottery, a mold charging apparatus above the general path of the molds for feeding charges of clay thereto successively presented thereunder, an extrusion machine arranged to supply an elongated mass of plastic clay containing sufficient material for a number of mold charges, a rigid refillable container arranged for receiving and carrying the mass of plastic clay discharged from the extrusion machine to the mold charging apparatus without distortion of the mass, the clay being delivered thereby to the mold charging apparatus in alignment with the trailing end of the mass of clay carried by the mold charging apparatus, there being a cutter associated with the mold charging apparatus for segregating individual mold charges and means for operating the cutter.

86. In combination with apparatus for advancing a line of pottery molds along a path wherein clay is formed on the molds into articles of pottery, a mold charging apparatus above the general path of the molds for feeding charges of clay thereto successively presented thereunder, an extrusion machine arranged to supply an elongated mass of plastic clay containing sufficient material for a number of mold charges, a rigid refillable container arranged for receiving and carrying the mass of plastic clay discharged from the extrusion machine to the mold charging apparatus without distortion of the mass and a support adjacent the trailing end of the mass of clay carried by the feeder, for receiving the container.

87. A system of supplying clay to the molds of an automatic jiggering machine which comprises positioning molds in consecutive order below the outlet of the passage through which plastic clay is forced, supplying additional quantities of clay to be forced through the passage by extruding masses of clay into rigid refillable containers and carrying the masses of clay thereby without distortion to a point adjacent the passage and from whence the mass of clay may be fed into the passage.

88. In combination with means for receiving and supporting jigger molds, apparatus for supplying clay to the molds comprising molds charging apparatus arranged to hold an elongated mass of clay movable therethrough, and to supply from the leading end of the mass individual charges to molds successively presented thereto, an extrusion machine arranged to produce independent elongated slugs of plastic clay each containing sufficient material for a multiple of mold-charges, and a rigid refillable receptacle for receiving and transporting slugs of clay to a position where the slug is in general alignment with the trailing end of said elongated mass and may be united thereto, and means for advancing the clay.

89. Apparatus for making dinnerware or like pottery ware comprising a pug-mill for extruding elongated slugs of clay, a series of elongated rigid receptacles, means for supporting the receptacles in clay-receiving relation to the pug-mill, whereby the slugs of clay are extruded to said receptacles and are supported thereby for substantially their entire length, a forming unit adapted to fabricate charges of clay into ware, severing means associated with the unit for producing individual charges of clay, means for guiding clay into position to be operated on by said severing means, said guiding means being remote from the pug-mill and adapted to receive clay by bodily transfer of one of the receptacles, with the slugs of clay supported thereby, from the discharge zone of the pug-mill, said guiding means being arranged to receive clay from successive receptacles in such manner that the trailing end of the slug of clay supplied from one receptacle is in alinement with the leading end of the slug of clay supplied from the succeeding receptacle and may be united therewith, and means for advancing the clay received by the guiding means at a predetermined rate.

90. In apparatus for applying charges of clay to jigger molds, the combination which comprises, a relatively movable mold chuck and die for spreading clay over the molding surface of a porous jigger mold, means for moving the die and chuck in relative fashion aforesaid capable of producing a slight separating movement of the die and chuck upon completion of the pressing operation, and means for stripping the clay and mold from the die upon slight separating movement of the chuck and die.

91. The process of applying jigger clay to jiggering molds which comprises, depositing the mold in a chuck, feeding a charge of clay to said mold, and by relative movement between a die, and the mold and chuck, spreading the charge over the molding surface of the mold, slightly separating the chuck and die at the completion of the pressing operation and disengaging the clay and mold from the die whilst the mold and chuck are slightly separated.

92. In combination with apparatus for advancing several lines of jigger molds to feeding and forming positions, charge segregating means associated with each line of molds, means for supporting an elongated mass of clay in endwise fashion adjacent each charge segregating means, each mass containing sufficient material for several mold charges, and apparatus for replenishing the elongated masses of clay with additional clay comprising an extrusion machine, and a plurality of transportable receptacles, for receiving and transporting clay from the extrusion machine to a position of alignment with the trailing end of the elongated masses of clay, there being receptacle supports adjacent each means for supporting elongated masses of clay for receiving, interchangeably, the various receptacles.

93. In the manufacture of jiggered pottery ware, the method of delivering a supply of jiggering clay from which mold charges are produced to a position from which it is fed to molds which comprises, extruding clay in a solid column of predetermined cross section into a rigid transportable receptacle shaped to fit the cross sectional shape of the extrusion, segregating the clay from the parent extrusion when the receptacle is filled, transporting the said receptacle to a feeding position and there dumping the clay out of the receptacle.

94. In the manufacture of jiggered pottery ware, the method of delivering a supply of jiggering clay from which mold charges are produced to a position from which it is fed to molds which comprises, extruding clay in a solid column of predetermined cross section into a rigid transportable receptacle, said receptacle being of such construction that it supports the detached body of clay in its original extruded shape over at least a portion of the surface area thereof in a direction parallel to the long axis thereof and perpendicular thereto, segregating the clay from the parent extrusion when the receptacle is filled, transporting the said receptacle to a feeding position and there dumping the clay out of the receptacle.

95. In the manufacture of jiggered pottery ware, the method of delivering a supply of jiggering clay from which mold charges are produced to a position from which it is fed to molds which comprises, extruding clay in a solid column of predetermined cross section into a rigid transportable receptacle, said receptacle being of such construction that it supports the clay in original extruded shape along all surfaces in contact therewith against deformation, segregating the clay from the parent mass, transporting said receptacle to a feeding position and there dumping the clay out of the receptacle.

96. In the manufacture of jiggered pottery ware, the method of delivering a supply of plastic clay to a position from which it is fed to molds which comprises, extruding a solid column of clay of predetermined cross section and then preserving the original extruded form and cross sectional shape of the column whilst transporting the same to a feeding position by receiving the column in a rigid transportable receptacle shaped to fit the cross sectional shape of the column at least in part, and transporting the column by means of said support to the aforesaid feeding position and there dumping the clay out of the receptacle.

97. In combination with a machine for extruding pottery jiggering clay in the form of a solid column of predetermined cross section, a transportable receptacle for receiving said extruded clay and transporting the same when detached from the parent body to a position from whence it is fed to molds comprising a body portion composed of rigid material having a cross sectional shape corresponding at least in part to the original extruded shape of the clay column and a support on which the receptacle is disposed incident to emptying said support having adjustable means for locating the receptacle at the emptying position.

98. In combination, a clay extrusion machine adapted to extrude a solid column of pottery clay, a transportable receptacle into which the clay column is extruded for transportation thereby to an emptying point and means on which said receptacle is movably supported whilst being filled with clay.

99. In combination, an extrusion machine adapted to produce a solid column of pottery clay, a support arranged adjacent said extrusion machine, transportable receptacles adapted to be supported on said support whilst being filled with clay from the extrusion machine, said support permitting relative movement between the receptacle and the extrusion machine whilst being filled.

100. In combination, an extrusion machine for producing a solid column of pottery clay, a movable support located adjacent thereto, transportable receptacles adapted to receive a column of clay mounted on said support, said receptacles being propelled on said support whilst being filled by the force of extrusion.

WILLIAM J. MILLER.